US006554500B2

(12) United States Patent
Melitopoulos

(10) Patent No.: US 6,554,500 B2
(45) Date of Patent: Apr. 29, 2003

(54) BALANCER SYSTEM FOR HAND-HELD CAMERAS

(75) Inventor: Jordanis Melitopoulos, Grassau (DE)

(73) Assignee: Sachtler GmbH & Co. KG, Unterschleissheim (DE)

( * ) Notice: Subject to any disclaimer, the term of this patent is extended or adjusted under 35 U.S.C. 154(b) by 0 days.

(21) Appl. No.: 10/008,984

(22) Filed: Dec. 6, 2001

(65) Prior Publication Data

US 2002/0090216 A1 Jul. 11, 2002

(30) Foreign Application Priority Data

Dec. 6, 2000 (DE) .......................................... 100 60 624

(51) Int. Cl.⁷ .............................................. G03B 17/00
(52) U.S. Cl. ....................... 396/428; 396/420; 396/421; 396/428; 352/243
(58) Field of Search ................................. 396/420, 421, 396/428; 352/243

(56) References Cited

U.S. PATENT DOCUMENTS

| 4,946,272 A | 8/1990 | Brown |
| 4,976,387 A | 12/1990 | Spianti |
| 5,229,798 A * | 7/1993 | Brown ........................ 352/243 |
| 5,963,749 A * | 10/1999 | Nicholson ................... 396/421 |
| 6,188,849 B1 * | 2/2001 | Staicouras .................. 396/421 |

FOREIGN PATENT DOCUMENTS

| WO | 96/15404 | 5/1996 |

OTHER PUBLICATIONS

Patent abstracts of Japan vol. 1998, No. 14 & JP 10–232446 published Sep. 2, 1998.

* cited by examiner

Primary Examiner—Alan A. Mathews
(74) Attorney, Agent, or Firm—Dilworth & Barrese LLP

(57) ABSTRACT

A balancer system for hand-held cameras includes a camera mounting mechanism, a pendulum arm, at least one counterweight and a handgrip. The counterweight can be attached to the pendulum arm and the pendulum arm is connected to the camera mounting mechanism. The pendulum arm is pendulum mounted on the handgrip. The handgrip is configured as a hollow bell-shaped balancer (1) which is flared at least in its lower section, when in use, and the pendulum arm is a substantially straight pendulum rod (2) extending through the bell-shaped balancer (1).

20 Claims, 1 Drawing Sheet

BALANCER SYSTEM FOR HAND-HELD CAMERAS

FIELD OF THE INVENTION

The invention relates to a balancer system for hand-held cameras comprising a camera mounting mechanism, a pendulum arm, at least one counterweight and a hand grip, said counterweight being attachable to said pendulum arm, said pendulum arm being connected to said camera mounting mechanism and said pendulum arm being pendulum mounted on said handgrip.

Such balancer systems serve to stabilize or steady hand-held video and movie cameras provided with a handgrip for guiding the camera. The objective of the balancer system is to prevent translation of tilt and roll motions from the handgrip to the camera in ensuring steady guiding of the camera at all times in preventing the camera from being rolled or tilted. For this purpose the balancer system is configured so that the camera is able to execute a pendulum motion relative to the handgrip. Counterweights attached to one end of a pendulum arm serve to steady the camera, the pendulum arm being secured at its other end to the camera equipment. Suitably selecting and positioning the counterweights enables the arrangement of pendulum arm and counterweights to balance the camera so that tilt or roll motions are not translated to the camera.

PRIOR ART

Such balancer systems for handling commercially available movie and video cameras are known in prior art. The pendulum arm of one known system is, for example, configured C-shaped, the one end thereof being connected to the camera and the counterweights being attached to its other end. The entirety of camera, C-arm and counterweight is connected by means of a so-called balance needle to a handgrip so that the handgrip can be rolled and tilted without slaving the camera in these motions.

Light, compact cameras are now finding increasing use for movie and video shooting since they produce just as good results as conventional heavier movie and video cameras. Known balancer systems are suitable for such lightweight, compact cameras only to a limited degree, however.

SUMMARY OF THE INVENTION

This objective is achieved by a balancer system wherein said handgrip is configured as a hollow bell-shaped balancer (1) which is flared in at least its lower section when in use and said pendulum arm is a substantially straight pendulum rod (2) extending through said bell-shaped balancer (1).

This objective is achieved by a balancer system as set forth in claim 1.

In accordance therewith the handgrip is configured as a bell-shaped balancer flared at least in its lower section. The pendulum arm is a substantially straight pendulum rod extending through the bell-shaped balancer.

Providing the conical bell-shaped balancer as the handgrip with the pendulum rod extending through the bell-shaped balancer offers substantial advantages. For one thing, due to its conical configuration the bell-shaped balancer is convenient in handling whilst offering sufficient freedom for the pendulum motion of the pendulum rod due to it being flared downwards. In addition, the balancer system in accordance with the invention takes up little room since the pendulum rod extends through the bell-shaped balancer, i.e. through the handgrip. The system in accordance with the invention together with the compact camera attached thereto can thus be guided through narrow communicating spaces, for example.

Another advantage of the balancer system in accordance with the invention is that due to the fact that the longitudinal centerline of the bell-shaped balancer coincides with that of the pendulum axis no additional tilting moments materialize between handgrip or bell-shaped balancer and pendulum rod.

Apart from this, the camera mounting mechanism with the camera mounted thereon is able to be panned through 360° any number of times relative to the bell-shaped balancer.

The balancer system in accordance with the invention is particularly suitable for cameras weighing up to 1000 g.

Advantageous aspects of the balancer system in accordance with the invention are described in the further claims.

Locating the pendulum rod relative to the bell-shaped balancer is preferably achieved e.g. by means of a gimbal mount so that the bell-shaped balancer can be rolled and tilted in any direction without the roll and tilt motion being translated to the camera. The gimbal mount is arranged in the upper part of the bell-shaped balancer and consists in one advantageous aspect, e.g. of two concentric rings. The outer one of these two rings is arranged tiltable about a first axis in the bell-shaped balancer and the inner one of the two rings can be tilted about a second axis relative to the outer ring.

To steady the camera against roll and tilt motions of the bell-shaped balancer the counterweight exerts a countermoment, the spacing between the counterweight and the mounting point of the pendulum rod in the bell-shaped balancer forming the lever arm. To permit adjusting this countermoment for various types of camera differing in weight, the counterweight is releasably attached to the pendulum rod so that depending on the weight of the camera a lighter or heavier counterweight can be used. In addition, the counterweight can be shifted along the pendulum rod and secured at various locations thereon so that the position of the counterweight relative to the camera and thus to the aforementioned lever arm of the camera mount can be likewise adapted to various types of camera.

Selecting a suitable counterweight as well as adapting the setting of the position thereof is of importance in that the balance system fails to satisfy its function in an unsuitable position of the counterweight and/or when the counterweight is too heavy or too light, resulting in the camera becoming pendulous. The weight of additionally attached camera accessories such as flashes or batteries can also steady the balancer system in accordance with the invention due to the counterweight being adaptable in weight and position.

To secure and shift the counterweight on the pendulum rod several possibilities exist. The counterweight can be continuously shifted relative to the pendulum rod and fixed in place at any location on the pendulum rod so that its position can be precisely set for any camera, including also any additionally attached camera accessory. For this purpose the counterweight may comprise, for example, a drilled hole through which the pendulum rod extends. In this case, the pendulum rod may comprise, for example, a male thread so that the counterweight can be secured by means of a fastener nut to the pendulum rod. The fastener nut can be simply screwed onto the pendulum rod so that no tool whatsoever is needed. Alternative possibilities for continuously setting the counterweight are likewise conceivable.

In another advantageous aspect of the balancer system in accordance with the invention the counterweight can be secured to specific locations on the pendulum rod. For this purpose holes, for example, may be formed in the pendulum rod into which pegs can be inserted to locate the counterweight on the pendulum rod. In this case the position of the counterweight on the pendulum rod is not continuously adjustable. This aspect offers, however, the advantage that the counterweight can be applied to the pendulum rod by means of the pegs speedily and simply at the specific locations corresponding to the suitable locations of counterweights for certain types of camera used more often.

The corresponding locations on the pendulum rod can then be identified by indicating the corresponding type of camera and the necessary counterweight.

The flared section of the outer wall of the bell-shaped balancer is preferably configured conical and the outer wall of the conical section of the bell-shaped balancer is preferably inclined at an angle between 5° and 25° relative to the longitudinal centerline of the bell-shaped balancer. A cone configured at such an angle is convenient to hold whilst offering sufficient room for pendulum action of the pendulum rod.

When a camera is mounted on the camera mounting mechanism it could be that the center-of-gravity of the camera fails to coincide with the longitudinal centerline of the pendulum rod, resulting in camera and camera mounting mechanism being able to roll relative to the bell-shaped balancer. To compensate this, the counterweight can be eccentrically attached to the pendulum rod so that the center-of-gravity of the counterweight does not coincide with the longitudinal centerline of the pendulum rod. By spacing the center-of-gravity of the counterweight from the pendulum rod a roll moment emerges which, in a suitable position of the counterweight, is able to counteract undesired roll of the camera. It is likewise possible to apply the counterweight to the pendulum rod so that the center-of-gravity of the counterweight is located on the longitudinal centerline of the pendulum rod.

The counterweight may comprise several holes to enable it to be attached either eccentrically or centrally relative to the pendulum rod.

For shifting the center-of-gravity of the camera relative to the pendulum rod the camera mounting mechanism itself may also serve just as well to a certain degree when, in accordance with an advantageous aspect, it consists of a base fixedly connected to the pendulum rod and an adapter plate, to which the camera is attached and which can be shifted to the right, left, fore and aft relative to the base by means of setscrews.

The balancer system serves not only to translationally guide but also to pan the camera about the longitudinal centerline of the pendulum rod. Slowly panning the bell-shaped balancer slaves the camera in the motion whereas panning the bell-shaped balancer more quickly results in the camera not being slaved in the motion due to its inertia. To permit precise control in panning the camera, an additional grip ring may be provided at the bottom the camera mounting mechanism. The operator can then hold the camera with one hand and pan it in a controlled manner relative to the bell-shaped balancer with the other hand by means of the grip ring.

In conclusion, several counterweights may be applied simultaneously to the pendulum rod in enabling heavy counterweights to be composed of several lighter counterweights, i.e. not needing to be provided as a single item.

BRIEF DESCRIPTION OF THE DRAWINGS

The invention will now be detailed by way of an example embodiment as shown in the drawings in which.

DETAILED DESCRIPTION OF A PREFERRED EMBODIMENT

Figure 1:
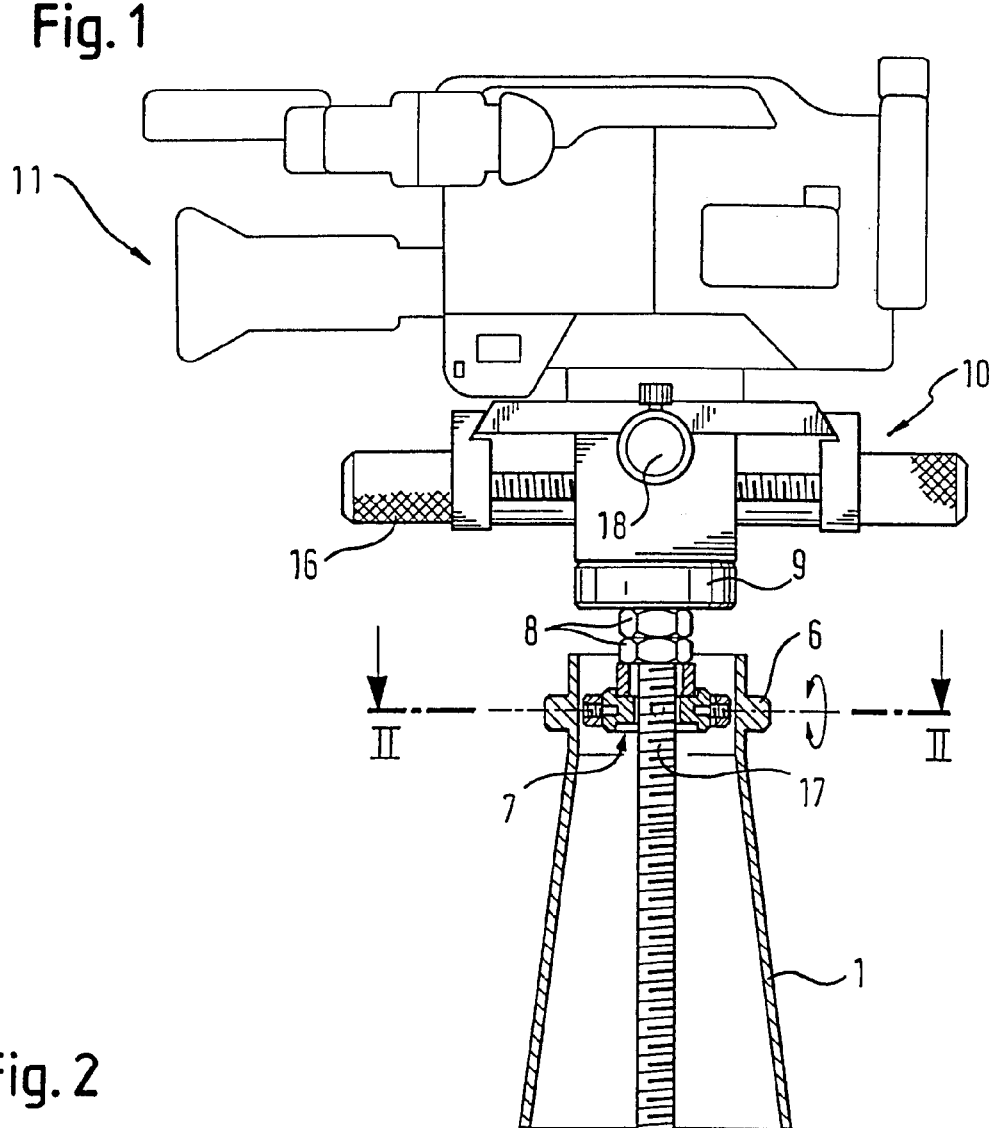
FIG. 1 is an illustration of a balancer system in accordance with the invention for hand-held cameras.

Referring now to FIG. 1 there is illustrated a preferred embodiment of the balancer system in accordance with the invention for a hand-held camera 11. Serving as a handgrip for guiding the camera is a bell-shaped balancer 1 conically flared in its lower section and made of, for example, aluminum or some other light alloy, plastics, metal or a composite. Due to its conical shape the bell-shaped balancer 1 is convenient to handle. To prevent the bell-shaped balancer 1 from slipping out of the hand, a flange 6 is provided at the upper end of the bell-shaped balancer. Instead of this, a grip molding (not shown) may be provided for this purpose to the outer surface area of the bell-shaped balancer 1.

Should the bell-shaped balancer 1 not be hand held in certain situations it can be clamped in a special support, such as a tripod and the like for which the flange 6 is likewise of advantage.

The conical bell-shaped balancer 1 offers adequate space for pendulum action of a pendulum rod 2. This pendulum rod 2 is mounted in the bell-shaped balancer 1 by a gimbal mount 7 so that it can execute pendulous motions in any direction relative to the handgrip. A camera mounting mechanism 10 for the camera 11 is secured to the upper end of the pendulum rod 2 so that it is likewise pendulum mounted relative to the bell-shaped balancer 1.

Setscrews 16 and 18 are provided for shifting the camera 11 relative to the longitudinal centerline of the pendulum rod 2 to the right, left, fore and aft.

Figure 2:
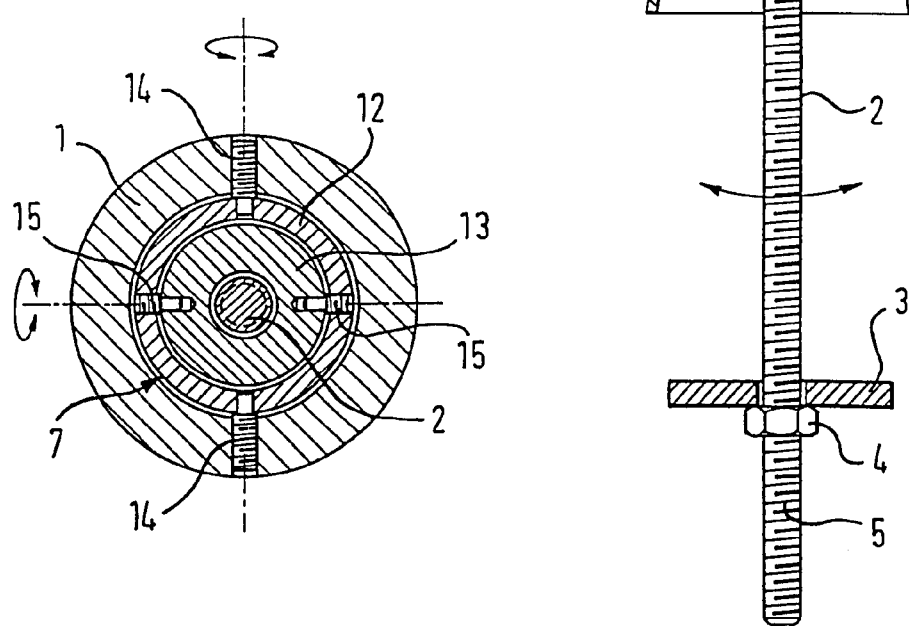
FIG. 2 is a section along the line II—II in FIG. 1.

Referring now to FIG. 2 there is illustrated the gimbal mount in more detail: an outer ring 12 is mounted by means of two screws 14 tiltable relative to the bell-shaped balancer 1, and an inner ring 13 is mounted tiltable relative to the outer ring 12 by means of two screws 15, whereby the two axes of rotation are located in the same plane and form an angle of 90°. The two rings may be made, for example, of aluminum or also injection-molded in plastics. The pendulum rod 2 extends through the inner ring 13, and two nuts 8 screwed onto an upper threaded section 17 of the pendulum rod 2 (see FIG. 1) rest on this inner ring 13 in thus holding the pendulum rod 2 in the gimbal mount 7. As an alternative a variety of other elements are just as conceivable for this purpose instead of the nuts 8 which by suitable ways and means—for example by pinning—can be secured to the pendulum rod or may be configured integrally with the pendulum rod.

To steady the camera 11 relative to the bell-shaped balancer 1 there is a counterweight 3 provided at the lower end of the pendulum rod 2. The counterweight 3 comprises a drilled hole through which the pendulum rod 2 extends, and locating the counterweight 3 relative to the pendulum rod 2 is done by means of a fastener nut 4 screwed onto a lower threaded section 5 of the pendulum rod 2. The fastener nut 4 may be replaced by any other suitable fastener for releasable attachment to the pendulum rod 2 by various ways and means.

By advancing and backing off the fastener nut 4 up and down the lower threaded section 5 of the pendulum rod 2, the counterweight 3 can be continuously set relative to the pendulum rod 2. In addition, the fastener nut 4 can be totally unscrewed from the pendulum rod 2 so that the counterweight 3 can be replaced by another heavier or lighter counterweight. By selecting a suitable counterweight 3 and suitably setting the spacing of the counterweight 3 from the camera 11, which in this embodiment can be continuously set by means of the fastener nut 4, the balancer system can be precisely adapted to the weight of the camera 11 secured at the time to the camera mounting mechanism 10, the camera 11 then remaining steady even when the bell-shaped balancer 1 is rolled and tilted. The roll and tilt motions must, of course, only occur in the region in which the pendulum rod 2 does not come into contact with the inner surface of the bell-shaped balancer 1.

In conclusion, the operator is able to pan the camera 11 with his free hand, i.e. not holding the bell-shaped balancer 1, by means of a grip ring 9 relative to the bell-shaped balancer 1 about the longitudinal centerline of the pendulum rod 2.

What is claimed is:

1. A balancer system for hand-held cameras comprising a camera mounting mechanism, a pendulum arm, at least one counterweight and a handgrip, said counterweight being attachable to said pendulum arm and said pendulum arm being connected to said camera mounting mechanism and said pendulum arm being pendulum mounted on said handgrip, characterized in that said handgrip is configured as a hollow bell-shaped balancer (1) which is flared in at least its lower section when in use and in that said pendulum arm is a substantially straight pendulum rod (2) extending through said bell-shaped balancer (1).

2. The balancer system as set forth in claim 1, characterized in that said pendulum rod (2) is pendulum mounted on said bell-shaped balancer (1) by means of a gimbal mount (7) arranged in the upper part of said bell-shaped balancer (1).

3. The balancer system as set forth in claim 2, characterized in that said gimbal mount (7) consists of two nested concentric rings (12, 13) arranged within said bell-shaped balancer (1), said pendulum rod (2) extending through the inner (13) of said two rings, said inner ring (13) being tiltably mounted relative to said outer ring (12) about a first axis, whereas said outer ring (12) is tiltably mounted relative to said bell-shaped balancer (1) about a second axis.

4. The balancer system as set forth in claim 1, characterized in that said counterweight (3) comprises at least one drilled hole, the inner diameter of which is slightly larger than the outer diameter of said pendulum rod (2), so that said counterweight (3) can be mounted on said pendulum rod (2) by means of said drilled hole.

5. The balancer system as set forth in claim 1, characterized in that said pendulum rod (2) is provided at least sectionwise with a male thread (5) and that at least one fastener nut (4) can be attached for fixing said counterweight (3) to said pendulum rod (2) in the region of said male thread (5).

6. The balancer system as set forth in claim 1, characterized in that said counterweight (3) is continuously shiftable along said pendulum rod (2) and can be fixed in place at any location along said pendulum rod (2).

7. The balancer system as set forth in claim 1, characterized in that said counterweight (3) can be shifted along said pendulum rod (2) and can be fixed in place at predetermined locations along said pendulum rod (2).

8. The balancer system as set forth in claim 1, characterized in that said pendulum rod (2) comprises holes and that said counterweight (3) can be fixed in place by means of pegs for insertion into said holes.

9. The balancer system as set forth in claim 1, characterized in that at least said lower section of said bell-shaped balancer (1) is conically flared, when in use.

10. The balancer system as set forth in claim 9, characterized in that at least said lower section of said bell-shaped balancer (1), when in use, is conically flared at an angle of 5° to 25° relative to the longitudinal centerline of said bell-shaped balancer (1).

11. The balancer system as set forth in claim 1, characterized in that said counterweight (3) is attachable to said pendulum rod (2) so that the center-of-gravity of said counterweight (3) is located on the longitudinal center line of said pendulum rod (2).

12. The balancer system as set forth in claim 1, characterized in that said counterweight (3) is attachable to said pendulum rod (2) so that the center-of-gravity of said counterweight (3) is not located on the longitudinal centerline of said pendulum rod (2).

13. The balancer system as set forth in claim 1, characterized in that said camera mounting mechanism (10) consists of a base fixedly connected to said pendulum rod and an adapter plate for attaching a camera (11) and which is shiftable by means of setscrews (16, 18) to the right/left and/or fore/aft relative to said base.

14. The balancer system as set forth in claim 1, characterized in that said camera mounting mechanism (10) comprises at its underside an additional grip ring (9) by means of which said camera (11) can be panned relative to said bell-shaped balancer (1).

15. The balancer system as set forth in claim 1, characterized in that several counterweights (3) are provided, of which a suitable number can be attached to said pendulum rod (2).

16. The balancer system as set forth in claim 2, characterized in that said counterweight (3) comprises at least one drilled hole, the inner diameter of which is slightly larger than the outer diameter of said pendulum rod (2), so that said counterweight (3) can be mounted on said pendulum rod (2) by means of said drilled hole.

17. The balancer system as set forth in claim 3, characterized in that said counterweight (3) comprises at least one drilled hole, the inner diameter of which is slightly larger than the outer diameter of said pendulum rod (2), so that said counterweight (3) can be mounted on siad pendulum rod (2) by means of said drilled hole.

18. The balancer system as set forth in claim 2, characterized in that said counterweight (3) can be shifted along said pendulum rod (2) and can be fixed in place at predetermined locations along said pendulum rod (2).

19. The balancer system as set forth in claim 3, characterized in that said counterweight (3) can be shifted along said pendulum rod (2) and can be fixed in place at predetermined locations along said pendulum rod (2).

20. The balancer system as set forth in claim 4, characterized in that said counterweight (3) can be shifted along said pendulum rod (2) and can be fixed in place at predetermined locations along said pendulum rod (2).

* * * * *